United States Patent [19]

Fornasari

[11] Patent Number: 4,711,270

[45] Date of Patent: Dec. 8, 1987

[54] THERMOELECTRIC VALVE FOR CHANNELING REFRIGERANT GASES INTO DIFFERENT TUBES IN REFRIGERATION DEVICES

[75] Inventor: Paolo Fornasari, Casale Monferrato, Italy

[73] Assignee: Eltek S.p.A., Alessandria, Italy

[21] Appl. No.: 948,416

[22] Filed: Dec. 31, 1986

[30] Foreign Application Priority Data

Jan. 27, 1986 [IT]  Italy ............................... 67062 A/86

[51] Int. Cl.⁴ ............................................. F16K 31/68
[52] U.S. Cl. ................................. 137/625.5; 251/11; 251/335.3
[58] Field of Search ............ 137/625.5; 251/11, 335.3; 236/68 R

[56] References Cited

U.S. PATENT DOCUMENTS 3,860,169  1/1975  Norman ............................. 251/11 X
4,114,645  9/1978  Pauliukonis ....................... 251/11 X

FOREIGN PATENT DOCUMENTS 2114741  8/1983  United Kingdom ................. 251/11

*Primary Examiner*—Robert G. Nilson
*Attorney, Agent, or Firm*—Browdy and Neimark

[57] ABSTRACT

A valve for channeling refrigerant gases into different tubes of refrigeration devices comprising a casing enclosing a waxy, thermally expandable mass hermetically sealed by an elastically deformable diaphragm that activates the rod of a needle valve controlling two outlets of gases entering the valve. The heating of the casing is achieved by means of one or a pair of electrically-powered thermistor(s) (PTC). The valve is hermetically sealed against gas leakage; the electrical components of the valve are enclosed in a housing made of an insulated material, and can be removed and interchanged with respect to a bracket connected to the body of the valve with a tube. The valve rod lies longitudinally within the tube and is hermetically enclosed by a diaphragm or metallic bellows.

7 Claims, 3 Drawing Figures

THERMOELECTRIC VALVE FOR CHANNELING REFRIGERANT GASES INTO DIFFERENT TUBES IN REFRIGERATION DEVICES

A valve for channeling refrigerant gases into different tubes of refrigeration devices comprising a casing enclosing a waxy, thermally expandable mass hermetically sealed by an elastically deformable diaphragm that activates the rod of a needle valve controlling two outlets of gases entering the valve. The heating of said casing is achieved by means of one or a pair of electrically-powered thermistor(s) (PTC). Said valve is hermetically sealed against gas leakage; the electrical components of the valve are enclosed in a housing made of an insulated material, and can be removed and interchanged with respect to a bracket connected to the body of the valve with a tube. The valve rod lies longitudinally within said tube and is hermetically enclosed by a diaphragm or metallic bellows (FIG. 1).

BACKGROUND OF THE INVENTION

Refrigeration devices, where it is necessary to send the refrigerant to different areas of the same device, are equipped with multiple-way valves controlled by a component governed by the core of an electromagnet, which closes or opens apertures for the passage of gas when said core moves.

The electromagnets used for this purpose have to be powerful because of the high pressure of refrigerant gases. This means using large, costly electromagnets that have well-known disadvantages.

One of the disadvantages in using electromagnets is the noise generated during operation. Direct current (DC) electromagnets have been proposed as a solution for eliminating, or at least reducing, this drawback. However, they require electronic modules to rectify the current. This solution has been generally ignored both because of high component costs and poor functional dependability resulting from the increased complexity of the device.

The present invention is a valve as described below which is reliable, durable, and silent. It comprises two elements:

an electrothermal element that can easily and rapidly be connected to a second mechanical element; the two parts are assembled by connecting the former element to a suppport bracket integral with the latter.

The present invention is also economically advantageous in addition to its other features.

The valve comprises a casing enclosing a waxy, thermally expandable mass; appropriate means for transforming the increase in volume of the thermosensitive mass into a linear movement; components activating a needle valve with respect to the seat of a multiple-way valve; and a pair of electrically-powered thermistors (PTC) in contact with the metal casing enclosing the thermally expandable mass.

Another feature of the valve is that its rod is electrically insulated with respect to the thermoelectric elements.

A further characteristic of the valve regards its structure that is designed so that the assembly of its elements occurs after welding internal components, while the elements are open; and the welds are tested for leakage before proceeding with the final stages of assembly because said welds are inaccessible once the valve is assembled.

The valve also comprises a mobile rod which is hermetically sealed in a diaphragm or metal bellows defining the circulating area of the refrigerant gas.

BRIEF DESCRIPTION OF THE DRAWINGS

The invention will be described further, by way of example, with reference to the accompanying drawings in which.

DESCRIPTION OF PREFERRED EMBODIMENTS

Figure 1:
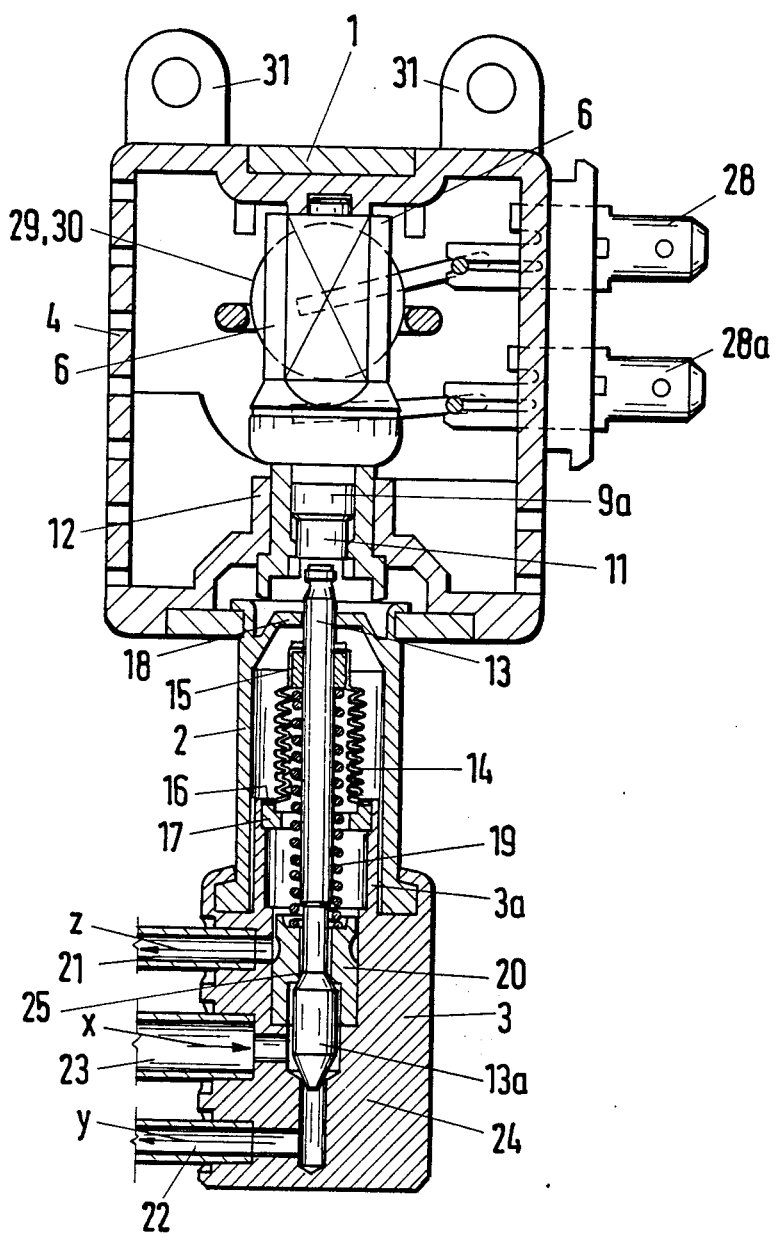
FIG. 1 is a large-scale, vertical cut-away view of the valve.
Figure 2:
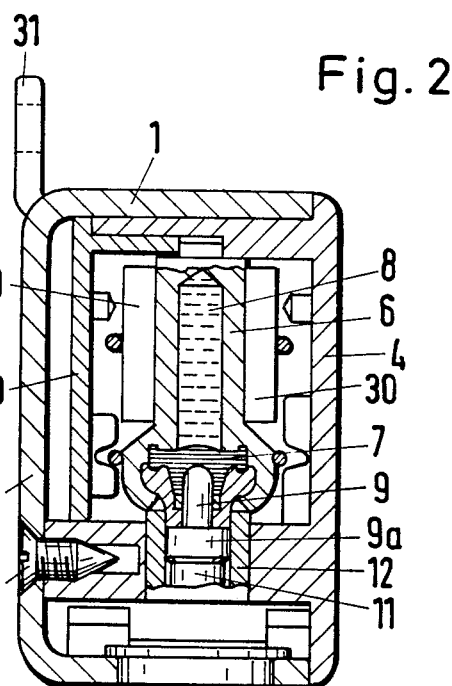
FIG. 2 is a partial cut-away view of the same valve turned 90° with respect to FIG. 1.

With reference to the figures, a metal bracket 1 is integral with a tube 2, which is connected to the body of the valve 3. Said bracket encompasses a housing made of electrically insulated material; said housing is joined to bracket 1 with a screw 5, and includes a removable cover 10. Said housing 4 contains the thermoelectric actuator 6,7,8; said actuator comprises a casing 6 containing a waxy, thermosensitive mass 8, and is hermetically sealed by an elastic membrane 7. Said membrane 7 is associated with a plunger 9,9a coaxial to a ceramic disk 11; said plunger and disk are able to slide back and forth in collar 12. Two thermistors (PTC) 29,30 are placed on the sides of casing 6, and are electrically powered through terminals 28,28a. If screw 5 is removed, housing 4 can be easily removed and replaced.

A rod 13 is enclosed longitudinally in tube 2 (FIG. 1), and is integral with needle head 13a. Ceramic disk 11 electrically insulates rod 13 and heat 13a from the electric components contained in housing 4.

Said rod 13 is contained in metal bellows 14, with respect to which it is hermetically welded at 15; said rod also passes through cylindrical spring 19 and perforated base 18. The oppposite end of metal bellows 14 is hermetically welded to collar 17 at the tubular extension 3a of the valve body 3. Spring 19 is compressed between weld 15 and bushing 20, the latter comprising a perimetric recess. Said bushing together with valve body 3 and needle head 13a constitutes the valve controlling the refrigerant, which enters tube 23 in the direction indicated by arrow -x-.

Figure 3:
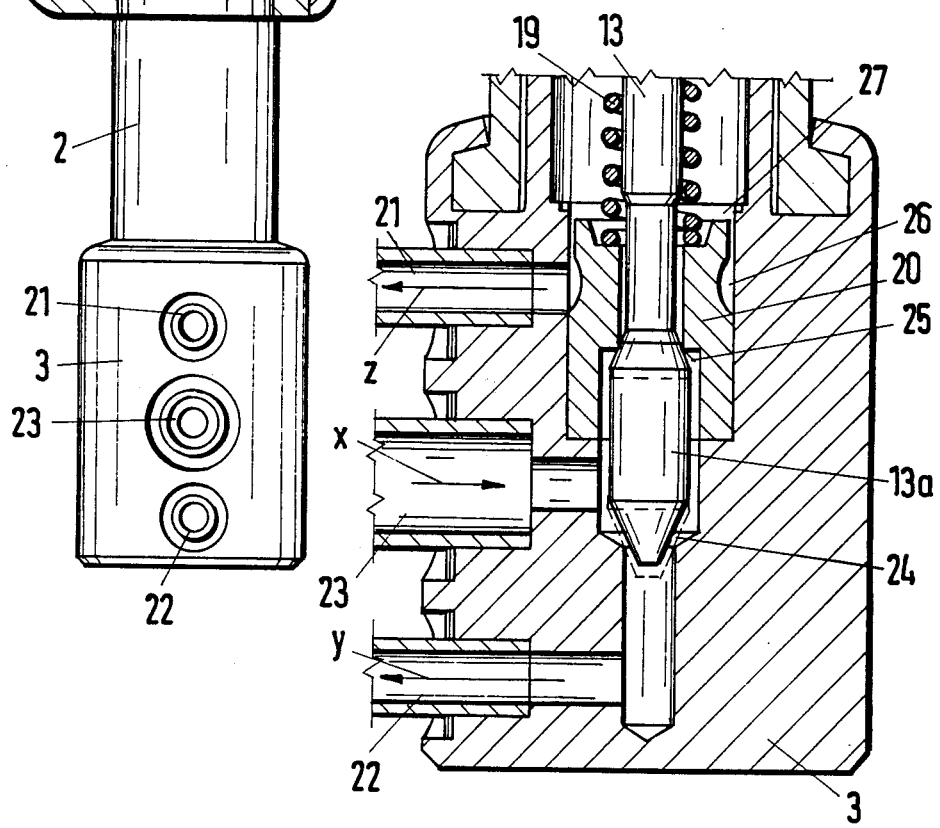
FIG. 3 is a large-scale detail of FIG. 1.

Valve operation is as follows:

When thermistors 29,30 are not electrically excited, needle head 13a and rod 13 are retained in the position shown in FIG. 1, and by the solid line in FIG. 3. Under these conditions the gas arriving in tube 23 passes through valve seat 24, which is open, and exits through tube 22, as indicated by arrow -y-. When thermistors 29,30 are electrically excited they rapidly increase in temperature, which by conduction, causes the thermally expandable mass 8 contained in casing 6 to melt. The increase in volume of the mass 8 generates a high pressure, which through seal 7, plunger 9,9a, and disk 11 is transmitted to rod 13; this high pressure acts against the spring 19 causing the longitudinal movement of rod 13 and head 13a; the latter goes from the position indicated by the solid line in FIG. 1 to the position indicated by the dashed line in FIG. 3. Under these conditions valve seat 24 closes simultaneously opening seat 25, which was previously closed. The refrigerant gas passes by recess 26 and exits through tube 21, as indicated by arrow -z-. In this case, the gas also enters the inside of the bellows 14, but goes no further. When power to the thermistors is shut off, the temperature drops inside the casing 6, and spring 19 causes the rod 13,13a to move back to the position shown in FIG. 1; the gas exits through tube 22.

Two eyelets (31) are used to fasten down the valve inside the refrigeration device.

The valve described in the present invention operates with a slight delay with respect to solenoid valves as electricity is sent to thermistors 29,30, and is then transformed into thermal energy melting the material enclosed in casing 6 by conduction. The slight delay does not effect valve operation or the devices controlled by it.

The main advantages resulting from the use of the valve can be summarized as follows:

The valve is extremely durable thanks to its structure; the metallic valve seats and needle head are able to pulverize any minor impurities present in the refrigerant.

The housing (4) containing th electrical components is easily and rapidly interchangeable.

High-power operation, which is considerably higher than the power of bulky, expensive electromagnets.

Small size; the device is only a couple cubic centimeters.

The assembly of the elemments occurs by welding while said elements are open; welds 15 and 16 of bellows 14 are performed before assembling the tube (2) to the bracket (1) and the valve body (3) so that the hermetic seal can be tested using compressed air.

Totally silent operation.

Production costs of the assembled valve are low, particularly considering the above mentioned features.

I claim:

1. A thermoelectric valve assembly for channeling refrigerant gases into different tubes of refrigeration devices comprising
    two assembled elements, said elements being a thermoelectric and a mechanical element,
    said thermoelectric element comprising
        a casing hermetically enclosing a thermally expandable waxy mass, a plunger for being acted upon by said waxy mass, and a ceramic dish for being acted upon by said plunger, said casing being sealed by an elastic seal axially associated with said plunger and ceramic disk, and
        an outer portion of said casing having two thermistors attached to it and connected to two terminals (28,28a) providing electric power,
    said mechanical element comprising
        a tube connecting said thermoelectric element, a three-way needle valve having a body, a needle head being comprised in the mechanical element; and a rod that is axial with said ceramic disk and plunger and passes through a perforated base of said tube,
    a metal
        bellows hermetically containing a cylindrical spring together with said rod,
    wherein
        the needle head is mounted so it can move in a bushing contained in the body of said three-way needle valve,
        the ends of said belows are welded on an outer circumference of said rod and on a collar contained in said tube connecting the rest of said three-way needle to a bracket, and
        said bracket supports a housing made of insulating material enclosing the thermoelectric element.

2. A valve as claimed in claim 1, in which the housing containing the thermoelectric element is assembled so as to be extracted from a bracket, with respect to which it is connected with removable fasteners.

3. A valve assembly as claimed as claimed in claim 1, in which said needle head and valve seats of said three-way needle valve are of metal, for making said valve longer lasting and assuring efficient operation.

4. A valve assembly as claimed in claim 1, in which the bracket is rigidly assembled to the body by means of a tube after being welded while open to permit welding operations and leakage testing with compressed air to be easily carried out, the resulting welds connecting said metal bellows to said rod and collar.

5. A valve assembly as claimed in claim 1, in which thermistors connected to electric terminals, as a heat source for the actuation of said valve are associated with a casing containing a thermally expandable mass creating considerable power, which acts mainly against reaction of a calibrated elastic device connected therewith.

6. A valve assembly as claimed in claim 1, in which the bracket, in addition to comprising the housing containing the thermoelectric element, compensates for stresses transmitted to the rod and needle head against the reaction of a spring.

7. A valve assembly as claimed in claim 1, in which an end of the rod and the plunger are inserted in an electrically insulating, thermally non-deformable type of said ceramic disk.

* * * * *